US010659416B2

(12) United States Patent
Burlin et al.

(10) Patent No.: US 10,659,416 B2
(45) Date of Patent: *May 19, 2020

(54) REMINDER VIEWS IN EMAIL APPLICATIONS

(71) Applicant: Microsoft Technology Licensing, LLC, Redmond, WA (US)

(72) Inventors: Eva Britta Karolina Burlin, Bellevue, WA (US); Chao-Chung Lin, Redmond, WA (US); David Claux, Redmond, WA (US); Kristian L.M. Andaker, Redmond, WA (US); Jason Todd Henderson, Redmond, WA (US); Russell Lee Simpson, Jr., Clyde Hill, WA (US); Jasdeep Singh Chugh, Newcastle, WA (US); Joseph P. McLaughlin, Seattle, WA (US); Jonathan D. Friedman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/265,897

(22) Filed: Feb. 1, 2019

(65) Prior Publication Data

US 2019/0173824 A1    Jun. 6, 2019

Related U.S. Application Data

(63) Continuation of application No. 13/804,583, filed on Mar. 14, 2013, now Pat. No. 10,200,328.

(51) Int. Cl.
*G06F 9/44*    (2018.01)
*G06Q 10/00*   (2012.01)
(Continued)

(52) U.S. Cl.
CPC ........... *H04L 51/22* (2013.01); *G06Q 10/107* (2013.01); *G06Q 10/10* (2013.01); *G06Q 10/109* (2013.01); *H04L 51/00* (2013.01)

(58) Field of Classification Search
CPC ......... H04L 51/22; H04L 51/00; H04L 45/00; H04L 67/10; G06Q 10/107; G06Q 10/109;
(Continued)

(56) References Cited

U.S. PATENT DOCUMENTS

2003/0233419 A1* 12/2003 Beringer .............. G06Q 10/107
                                                      709/206
2004/0153342 A1*  8/2004 Armintor ............... G06Q 10/10
                                                          705/3

(Continued)

OTHER PUBLICATIONS

"Second Office Action Issued in Chinese Patent Application No. 201480028308.5", dated Jan. 11, 2019, 12 Pages.

(Continued)

*Primary Examiner* — Hitesh Patel
*Assistant Examiner* — Clifton Houston

(57) ABSTRACT

Systems, methods, and software disclosed herein facilitate draft reminders. In at least one implementation, a primary view of an information management application is rendered. In various scenarios the primary view may include primary items, such as emails, events, tasks, or other types of items. When a reminder view is invoked, draft items are identified to include in the reminder view. The reminder view is then rendered in an overlaid manner with respect to the primary view and includes the draft items.

20 Claims, 5 Drawing Sheets

(51) Int. Cl.
*H04L 12/58* (2006.01)
*G06Q 10/10* (2012.01)

(58) Field of Classification Search
CPC .......... G06Q 10/10; G06F 2009/45595; G06F 9/45558
See application file for complete search history.

(56) References Cited

U.S. PATENT DOCUMENTS

| | | | |
|---|---|---|---|
| 2006/0080619 A1* | 4/2006 | Carlson | G06Q 10/10 715/781 |
| 2006/0242037 A1* | 10/2006 | Tanimura | G06Q 30/02 705/35 |
| 2007/0011258 A1* | 1/2007 | Khoo | G06F 3/0482 709/206 |
| 2007/0021154 A1* | 1/2007 | Jung | H04M 1/72547 455/566 |
| 2007/0136430 A1* | 6/2007 | Qureshi | H04L 51/30 709/206 |
| 2007/0162785 A1* | 7/2007 | Downer | G06F 11/1402 714/15 |
| 2008/0005250 A1* | 1/2008 | Oksum | G06Q 10/107 709/206 |
| 2008/0033950 A1* | 2/2008 | Lemay | G06Q 10/107 |
| 2008/0162651 A1* | 7/2008 | Madnani | G06Q 10/107 709/206 |
| 2009/0216836 A1* | 8/2009 | Haynes | G06Q 10/107 709/204 |
| 2010/0162168 A1* | 6/2010 | Lee | G06Q 10/107 715/821 |
| 2010/0262657 A1* | 10/2010 | Little | G06T 3/4092 709/204 |
| 2011/0191429 A1* | 8/2011 | Tu | G06F 15/16 709/206 |
| 2013/0318176 A1* | 11/2013 | Claux | G06Q 10/107 709/206 |
| 2013/0346408 A1* | 12/2013 | Duarte | G06Q 10/10 707/737 |
| 2015/0149502 A1* | 5/2015 | Rao | G06Q 10/107 707/770 |

OTHER PUBLICATIONS

"Third Office Action and Search Report Issued in Chinese Patent Application No. 201480028308.5", dated Apr. 28, 2019, 8 Pages.

* cited by examiner

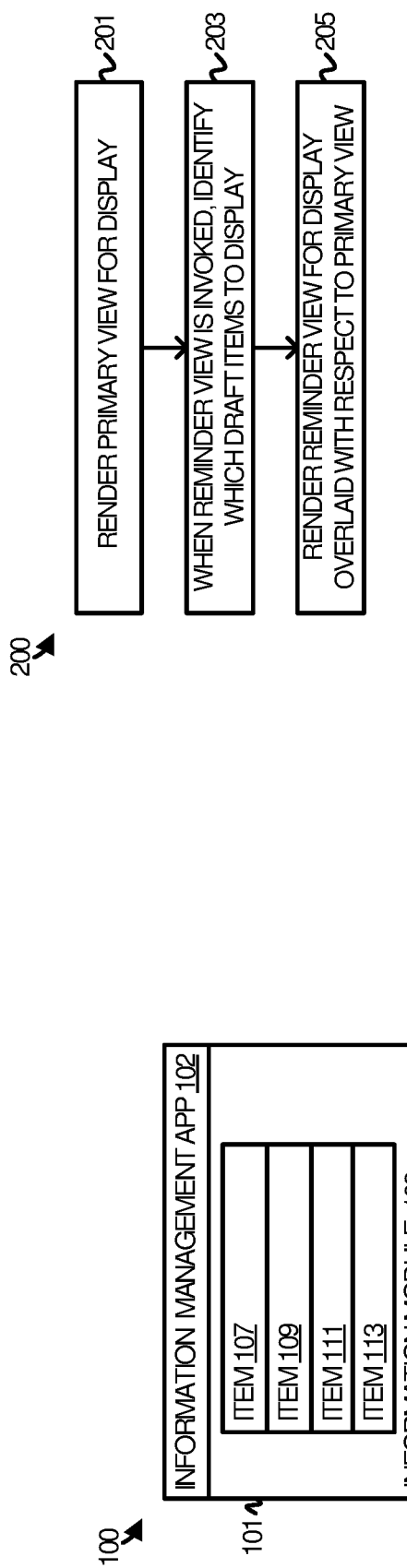
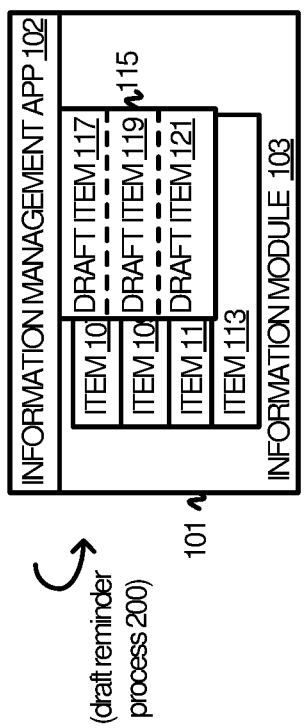
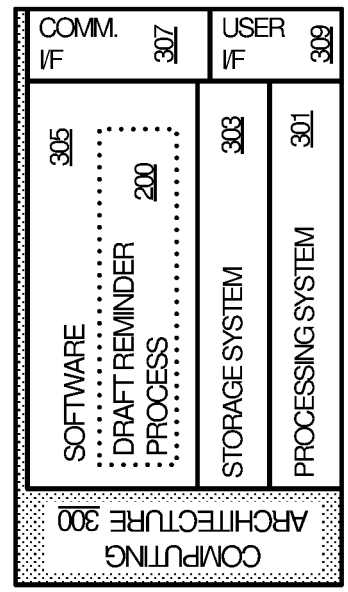
FIGURE 1
FIGURE 2
FIGURE 3

REMINDER VIEWS IN EMAIL APPLICATIONS

RELATED APPLICATIONS

This application is a continuation of and claims the benefit of priority to U.S. application Ser. No. 13/804,583, entitled "Reminder Views for Facilitating Draft Reminders," which will grant on Feb. 5, 2019 as U.S. Pat. No. 10,200,328, and which is hereby incorporated by reference in its entirety.

TECHNICAL BACKGROUND

Information management applications provide users with effective and convenient ways to communicate with others and manage their information. Examples of information management applications include but are not limited to email applications and calendar applications. Some information management applications integrate these various types of applications by way of modules, such as email, calendar, contact, and task modules, although each type of application or functionality may also be provided in a stand-alone manner Microsoft® Outlook® is one example of an information management application.

While many information management applications are provided as locally installed and executed applications, many can be experienced in a wide variety of ways. For example, some information management applications are available as web-based applications that are experienced through a browser application, as mobile applications customized for mobile environment, or even as a mobile web-based application generally developed for a mobile browser experience. In addition, information management applications can be experienced on a wide variety of computing devices, such as desktop, laptop, or tablet computers, mobile phones, gaming systems, Internet appliances, or any other physical or virtual computing system, variation, or combination thereof.

Among many other features, most information management applications include draft features that store draft items started but not yet completed by a user. For example, a user may begin email, but not send it. The draft email can be saved in a drafts folder, to which the user may return at a later time to complete or delete drafts. Some applications provide an indication within a conversation view of an inbox that a particular email has a draft reply associated with it.

Another feature related to calendar modules involves reminding users of upcoming or past due events scheduled on behalf of a user. For example, upon navigating to a view of a calendar module, the user may be notified of various scheduled events by way of a window or other view within which the scheduled events are presented.

Overview

Provided herein are systems, methods, and software for facilitating draft reminders. In at least one implementation, a primary view of an information management application is rendered. In various scenarios the primary view may include primary items, such as emails, events, tasks, or other types of items. When a reminder view is invoked, draft items are identified to include in the reminder view. The reminder view is then rendered in an overlaid manner with respect to the primary view and includes the draft items.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates an operational scenario associated with an information management application in an implementation.

FIG. 2 illustrates a draft reminder process in an implementation.

FIG. 3 illustrates a computing architecture in an implementation.

TECHNICAL DISCLOSURE

Figure 4:
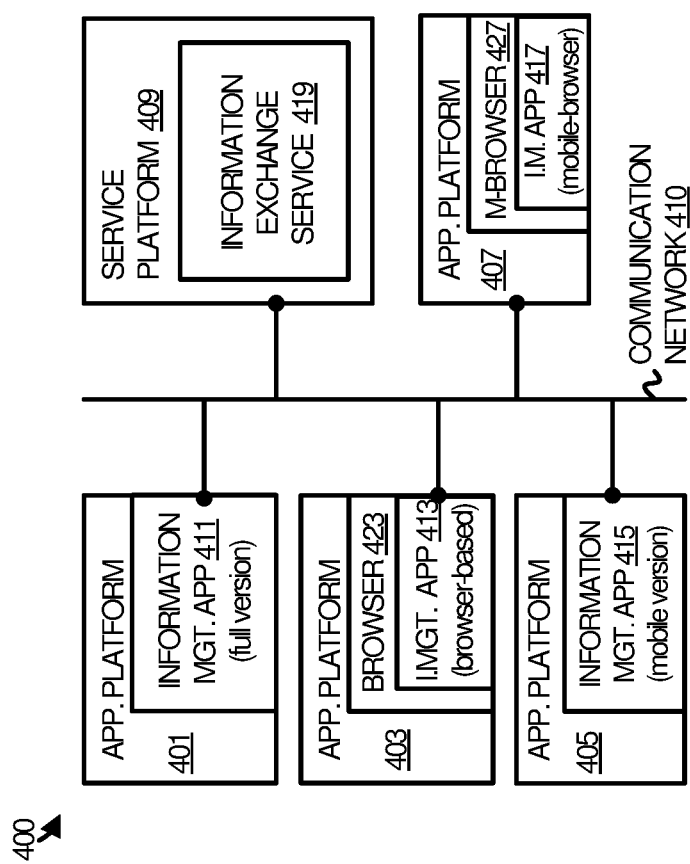
FIG. 4 illustrates an information exchange environment in an implementation.

Implementations disclosed herein facilitate improved draft reminders that alert users to the presence of draft items. In particular, a reminder view that includes various draft items, such a selection of draft emails, may be rendered for display such that the reminder view is overlaid with respect to a primary view. The primary view may include, for example, a user's inbox. Rather than having the user navigate away from the inbox to a drafts folder in order to view drafts, the user can maintain their position in the inbox.

Other examples may involve other types of draft items. For example, a user may from time to time generate various draft calendar events that remain uncompleted. The user can be alerted to the presence of the draft calendar events by way of the reminder view. Other draft items may also be included in a reminder view, such as tasks or contacts. The reminder view may be displayed when the user is working within an email module, but may also be displayed with respect to any other module, such as a contacts, task, or calendar module. In some scenarios, draft content is displayed within each draft item such that a user can view at least a portion of what she had begun to compose.

A reminder view may be invoked in a variety of ways. In some implementations a graphic may be presented within a view that is selectable. Selection of the graphic may directly or indirectly launch a reminder view. In other scenarios, a reminder view may be presented each time an information management application is launched. In yet other scenarios, a reminder view may be presented each time a user navigates between modules, such as from a calendar module to an email module.

Referring now to the drawings, FIG. 1 illustrates an operational scenario 100 associated with a view 101 of information management application 102. In particular, operational scenario 100 illustrates draft reminder process 200, illustrated in FIG. 2, as applied to information management application 102. View 101 of personal application 102 includes an information module 103 and various information items, item 107, item 109, item 111, and item 113.

Information management application 102 may be any application or collection of applications, module or collection of modules, service or services, or any variation or combination thereof capable of providing information management services and functionality. Examples of information management application 102 include Microsoft® Outlook®, Outlook® Web App, Mobile Outlook®, Hotmail®, Outlook.com, and Gmail, as well as any other information management application.

Information management application 102 may include one or more information modules, of which information module 103 is representative. Information module 103 may be any component or other aspect of information management application 102 with which a user interacts to gain access to at least some of the various functions and services provided by information management application 102. Examples of information module 103 include email modules, calendar modules, task modules, and contact modules, as well as any other type of module, combination, or variation thereof.

Item 107, item 109, item 111, and item 113 are each representative of an information item that may be interacted with through information module 103. Examples of such information items include emails, calendar events, tasks, and contacts, as well as any other type of information item, combination, or variation thereof. In some implementations, various types of information items may be associated with various types of information modules. For examples, emails may be associated with email modules, calendar events with calendar modules, and so on.

The following discussion now makes references to the steps illustrated in FIG. 2 with respect to draft reminder process 200. In operation, a primary view of information management application 102, of which view 101 is representative (step 201). A primary view may be any view of an information management application that is presently active and displayed and includes at least some information items. For example, if a user is engaged with an email inbox within an email module, the primary view may include at least a portion of the email inbox or at least some other portion of the email module, or some combination of both.

While rendering or otherwise presenting at least a portion of the primary view, a reminder view may be invoked, in response to which time draft items are identified to be included in the reminder view (step 203). It may be appreciated that identifying the draft items may occur directly or indirectly in response to the reminder view being invoked. The reminder view may be invoked in a variety of ways, such as being automatically triggered upon launching an information management application, by the selection of a tool, button, or some other user-initiated trigger, on a periodic basis, or in some other manner. For example, the reminder view may be invoked upon a user selection of a reminder graphic that, when selected, directly or indirectly invokes the reminder view. In another example, the reminder view may be invoked each time navigation is returned to a particular information module, such as each time a user navigates back to an email module or some other module with respect to which a reminder view is provided.

Identifying the draft items may occur in a variety of ways. In some scenarios, a subset of all existing draft items may be identified for inclusion in the reminder view. The subset may be selected based on reminder criteria, such as their age, subject, participant associations, the amount of or other measure of conversation activity, scheduling activity, or any other type of activity associated with each existing draft, or any other suitable criteria for filtering draft items. In some scenarios, it may be the case that all existing drafts are identified for inclusion in the reminder view.

Having identified the draft items for inclusion in the reminder view, the reminder view is rendered for display in an overlaid manner with respect to the primary view (step 205). Referring to FIG. 1, it may be appreciated that reminder view 115 is overlaid with respect to view 101. It may also be appreciated that draft item 117, draft item 119, and draft item 121 are included in reminder view 115, representative of the draft items and their selection discussed above. While reminder view 115 includes three draft items, it may be appreciated that less than three or more than three draft items are possible. In fact, in some scenarios it may be possible to scroll up or down or in some other direction to navigate within reminder view 115 to other draft items not readily visible at the outset.

In some implementations, the draft items as rendered within reminder view 115 may include at least some content that was originated during the creation of each draft. For example, a draft email may include in a visible manner some text that was written during creation of the draft. In another example, a task may include some task generated during creation of the task. A draft calendar item may include some event details visible within the context of reminder view 115, as might a contact include some contact information or other draft content.

In some implementations, any of the draft items may be interacted with or at least selected for additional drafting from within reminder view 115. For example, a user may click on, touch, or otherwise select draft item 117, at which time the user may be able to edit draft item 117, possibly from directly within reminder view 115 but also possibly in some other manner. For example, the user may be taken to another view, such as view 101 or some other view, within which draft item 117 can be edited.

Draft reminder process 200, and reminder view 115, may be especially helpful to some users who create drafts and wish to later return to them. In at least one scenario, in-line replies may be supported by an email application. In such a scenario, a user may initiate a draft reply to an email, the content of which resides in a viewing frame for that email. In other words, initiating the draft may not launch a separate window or other visual cue associated with the draft. To later return to the draft, the user may have to scroll to or otherwise search for the email in response to which the draft was created. This can be time consuming and frustrating.

Reminder view 115 may assist with such a scenario by giving the user an improved way to navigate to draft items. Rather than having to scroll to or search for other emails related to a draft, the user can merely access reminder view 115. At other times, a user may simply forget or lose track of a draft and the reminder provided by reminder view 115 may prompt the user to complete or otherwise attend to the draft. This may also allow the user to view drafts without having to navigate to a drafts folder, thereby leaving a view that includes, for example, an inbox, calendar, or task list.

It may be appreciated that, while the discussion of draft reminder process 200 generally refers to specific steps, such as rendering a primary view, identifying which draft items to display, and rendering a reminder view, variations of reminder process 200 are possible and may be considered within the scope of the present disclosure. Taking the step of initiating any of the aforementioned steps, as opposed to fully carrying them out, may be considered a variation.

Thus, initiating rendering of a primary view or a reminder view or initiating the identification of draft items may be considered a variation on the specific steps illustrated in FIG. 2. For example, one element may initiate the step of rendering a view by making a call to or otherwise communicating with another element, while the other element may perform the step of rendering or otherwise presenting the view.

The term rendering as used herein generally refers to the various capabilities employed in various computing architectures to assemble information that can then be used by other capabilities to generate an image or images. Within the context of draft reminder process 200, for example, rendering a primary view generally refers to assembling the information or data used to generate an image or images that together result in the primary view. In another example, rendering a reminder view generally refers to assembling the information or data used to generate an image or images that together result in the reminder view. Animation or other dynamics may also be used to achieve certain effects.

However, it may be appreciated that other perspectives on rendering may be considered within the scope of the present disclosure. For example, rendering as used herein may also, in some scenarios, be considered to refer to the various capabilities employed by various computing architectures to generate an image or images from information assembled for that purpose. With respect to draft reminder process 200, rendering a primary view may refer to generating an image or images, from information assembled for that purpose, that together result in the primary view, which can then be displayed. In another example, rendering a reminder review may refer to generating an image or images, from information assembled for that purpose, that together result in the reminder view.

It may also be appreciated that rendering in some scenarios may refer to a combination of the aforementioned possibilities. For example, rendering in some scenarios may refer to both assembling the information used to generate an image or images for a view and then generating the image or images of the view. In addition, a wide variety of other steps, processes, and stages may occur within the context of presenting views of an application, all of which may be considered part of presenting a view. Thus, yet one other variation on draft reminder process 200 includes, but is not limited to, initiating the presentation of a primary view, identifying draft items to include a reminder view, and initiating presentation of the reminder view.

Referring now to FIG. 3, computing architecture 300 is representative of an architecture that may be employed in any apparatus, system, or device, or collections thereof, to suitably implement all or portions of draft reminder process 200 or variations thereof and optionally all or portions of information management application 102. Draft reminder process 200 may be implemented on a single apparatus, system, or device or may be implemented in a distributed manner. Information management application 102 may also be implemented on a single apparatus, system, or device or may be implemented in a distributed manner. Draft reminder process 200 may be integrated with information management application 102, but may also stand alone or be embodied in some other application.

Computing architecture 300 may be employed in, for example, desktop computers, laptop computers, tablet computers, notebook computers, mobile computing devices, cell phones, media devices, and gaming devices, as well as any other type of physical or virtual computing machine and any combination or variation thereof. Computing architecture 300 may also be employed in, for example, server computers, cloud computing platforms, data centers, any physical or virtual computing machine, and any variation or combination thereof.

Computing architecture 300 includes processing system 301, storage system 303, software 305, communication interface 307, and user interface 309. Processing system 301 is operatively coupled with storage system 303, communication interface 307, and user interface 309. Processing system 301 loads and executes software 305 from storage system 303. When executed by processing system 301, software 305 directs processing system 301 to operate as described herein for draft reminder process 200 or its variations. Computing architecture 300 may optionally include additional devices, features, or functionality not discussed here for purposes of brevity.

Referring still to FIG. 3, processing system 301 may comprise a microprocessor and other circuitry that retrieves and executes software 305 from storage system 303. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device, combinations, or variation.

Storage system 303 may comprise any computer readable storage media readable by processing system 301 and capable of storing software 305. Storage system 303 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations storage system 303 may also include communication media over which software 305 may be communicated internally or externally. Storage system 303 may be implemented as a single storage device but may also be implemented across multiple storage devices or sub-systems co-located or distributed relative to each other. Storage system 303 may comprise additional elements, such as a controller, capable of communicating with processing system 301 or possibly other systems.

Software 305 may be implemented in program instructions and among other functions may, when executed by processing system 301, direct processing system 301 to operate as described herein for draft reminder process 200. Software 305 may include additional processes, programs, or components, such as operating system software or other application software. Software 305 may also comprise firmware or some other form of machine-readable processing instructions executable by processing system 301.

In general, software 305 may, when loaded into processing system 301 and executed, transform a suitable apparatus, system, or device employing computing architecture 300 overall from a general-purpose computing system into a special-purpose computing system customized to facilitate draft reminders as described herein for each implementation. Indeed, encoding software 305 on storage system 303 may transform the physical structure of storage system 303. The specific transformation of the physical structure may depend on various factors in different implementations of this description. Examples of such factors may include, but are not limited to the technology used to implement the storage media of storage system 303 and whether the computer-storage media are characterized as primary or secondary storage, as well as other factors.

For example, if the computer-storage media are implemented as semiconductor-based memory, software 305 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing architecture 300 is generally intended to represent an architecture on which software 305 may be deployed and executed in order to implement draft reminder process 200 (and variations thereof) and optionally all or portions of information management application 102. However, computing architecture 300 may also be suitable for any computing system on which software 305 may be staged and from where software 305 may be distributed, transported, downloaded, or otherwise provided to yet another computing system for deployment and execution, or yet additional distribution.

Referring again to FIG. 1, through the operation of a suitable computing system employing software 305, transformations may be performed with respect to view 101 of information management application 102. As an example, view 101 could be considered transformed from one state to another when subject to draft reminder process 200 or variations thereof. In a first state, processing system 301 may render view 101 without reminder view 115. Responsive to reminder view 115 being invoked, reminder view 115 may be rendered; thereby changing view 101 to a second, different state that includes reminder view 115 overlaid upon at least a portion of it.

Referring again to FIG. 3, communication interface 307 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface 309 may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 309. In some cases, the input and output devices may be combined in a single device, such as a display capable of displaying images and receiving touch gestures. The aforementioned user input and output devices are well known in the art and need not be discussed at length here. User interface 309 may also include associated user interface software executable by processing system 301 in support of the various user input and output devices discussed above. Separately or in conjunction with each other and other hardware and software elements, the user interface software and devices may provide a graphical user interface, a natural user interface, or any other kind of user interface.

FIG. 4 illustrates information exchange environment 400 in which an information exchange service may be carried out. In particular, FIG. 4 includes application platform 401, application platform 403, application platform 405, and application platform 407. Each of the application platforms 401, 403, 405, and 407 may communicate with service platform over communication network 410. Examples of application platforms 401, 403, 405, and 407 include, but are not limited to, desktop computers, work stations, laptop computers, notebook computers, tablet computers, mobile phones, personal digital assistances, media devices, gaming devices, and any other physical or virtual computing machine or combinations and variations thereof.

Application platform 401 may be any computing apparatus, system, device, or collections thereof that employ a computing architecture suitable for implementing information management application 411. Computing architecture 300 referred to with respect to FIG. 3 is one such representative architecture. Information management application 411 may be considered a full version that is locally installed and executed. In some cases, information management application 411 may operate in a hybrid manner whereby at least a portion of it is locally installed and executed while other portions are executed remotely or are streamed to application platform 401 for local execution. Information management application 411 may be embodied in program instructions that, when executed by application platform 401, direct application platform 401 to operate as described herein for draft reminder process 200 or variations thereof. Examples of information management application 411 include Microsoft® Outlook®, Mozilla Thunderbird/Lightening, and Open Xchange, as well as any other information management application capable of operating as described herein.

Application platform 403 may be any computing apparatus, system, device, or collections thereof that employ a computing architecture suitable for implementing information management application 413. Computing architecture 300 referred to with respect to FIG. 3 is one such representative architecture. Information management application 413 may be considered a browser-based version that is executed within the context of browser 423. In some cases, information management application 413 may operate in a hybrid manner whereby at least a portion of it is executed within browser 423 while other parts are executed remotely or streamed to application platform 403. Information management application 413 may be embodied in program instructions that, when executed by application platform 403, direct application platform 403 to operate as described herein for draft reminder process 200 or variations thereof. Examples of information management application 413 include Microsoft® Outlook® Web App, Outlook.com®, and Gmail, as well as any other information management application capable of operating as described herein.

Application platform 405 may be any computing apparatus, system, device, or collections thereof that employ a computing architecture suitable for implementing information management application 415. Computing architecture 300 referred to with respect to FIG. 3 is one such representative architecture. Information management application 415 may be considered a mobile application version. Information management application 415 may be embodied in program instructions that, when executed by application platform 405, direct application platform 405 to operate as described herein for draft reminder process 200 or variations thereof. Examples of information management application 415 include the mobile version of Microsoft® Outlook®, mobile versions of Gmail, and other mobile clients capable of operating as described herein.

Application platform 407 may be any computing apparatus, system, device, or collections thereof that employ a computing architecture suitable for implementing information management application 417. Computing architecture 300 referred to with respect to FIG. 3 is one such representative architecture. Information management application 417 may be considered a mobile web-based version that executes fully or in part within a mobile browser 427. Information management application 417 may be embodied in program instructions that, when executed by application platform 407, direct application platform 407 to operate as described herein for draft reminder process 200 or variations thereof. Examples of information management application 417 include the mobile browser-based version of Microsoft® Outlook®, the mobile browser-based versions of Gmail, and other mobile browser-based mobile clients capable of operating as described herein.

Service platform 409 may be any computing apparatus, system, device, or collections thereof that employ a computing architecture suitable for implementing information exchange service 419. Computing architecture 300 referred to with respect to FIG. 3 is one such representative architecture. Examples of service platform 409 include server computers, cloud computing platforms, data centers, and any physical or virtual computing machine, as well as any variation or combination thereof. Examples of information exchange service 419 include Microsoft® Exchange®, Microsoft® O365®, Hotmail®, Outlook.com®, and Gmail, as well as any other information exchange service, combination, or variation thereof capable of operating as described herein.

In operation, any of the applications platforms 401, 403, 405, and 407 may communicate from time to time with service platform 409 to facilitate the exchange of information between information management applications 411, 413, 415, and 417 and information exchange service 419. For example, emails may be sent and received, calendar events may be scheduled and synched, tasks may be created or completed, or contacts may be accessed. A wide variety of interactions are possible that result in the exchange of information and may be considered within the scope of this disclosure.

Figure 5:
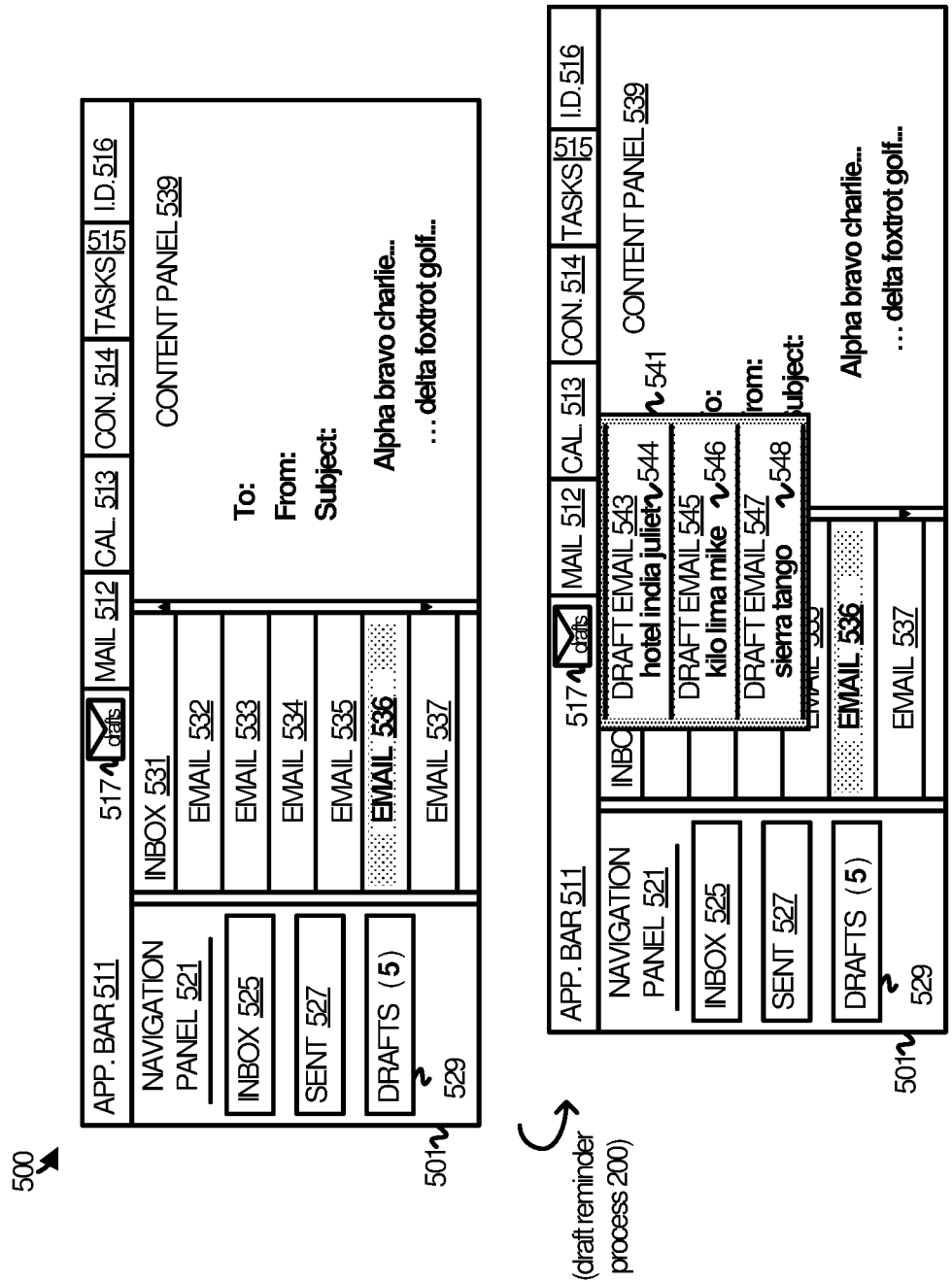
FIG. 5 illustrates another operational scenario associated with an information management application in an implementation.

FIG. 5 illustrates one particular view 501 of one or more of information management applications 411, 413, 415, and 417 that may be encountered by a user when working with the features and functions provided therewith. FIG. 5 also illustrates an operational scenario 500 that demonstrates how view 501 may be modified upon the implementation of draft reminder process 200 or variations thereof.

View 501, which is representative of a primary view of an information management application, includes an application bar 511, sometimes referred to as an information area. Application bar 511 includes several selectable options that, when selected, launch the presentation of other views associated with other modules or possibly a reminder view. In particular, mail option 512 corresponds to an email module, calendar option 513 corresponds to a calendar module, contacts option 514 corresponds to a contacts module, and tasks option 515 corresponds to a tasks module. Application bar 511 also includes an identity option 516 representative of an identity of a user engaged with view 501. Reminder option 517 is also included in application bar 511, a discussion of which follows in more detail below. View 501 may include additional features or some of the features discussed herein may be omitted. View 501 may vary based on its particular deployment. For example, view 501 may include more features when deployed with respect to a full-version of an information management application relative to when deployed as a mobile version.

For exemplary purposes, it is assumed that mail option 512 has been selected and thus view 501 is representative of a view that may be encountered when working with an email module. Accordingly, view 501 includes various panels having various items and other functionality rendered and available for interaction with a user. Navigation panel 521 includes, but is not limited to, various folders that a user may select in order to access their contents, such as an inbox folder 525, a sent folder 527, and a drafts folder 529. Depending upon which folder is selected, its corresponding contents may be displayed in the panel adjacent to navigation panel 521. It is assumed here for exemplary purposes that inbox folder 525 is selected. Accordingly, inbox 531 and its contents are displayed adjacent to navigation panel 521. It may be appreciated that the various panels and their contents could be arranged in a variety of ways and are not limited to just those disclosed herein.

Content panel 539 provides a more detailed view of a selected item. For example, content panel includes content associated with email 536, assumed for exemplary purposes to have been selected by a user for reading, editing, or the like. Other aspects may be included in content panel 539, such as in-line reply capabilities, that are well known and need not be discussed at length here.

Referring back to application bar 511, reminder option 517 is a graphic or some other component, the selection of which launches reminder view 541 either directly or indirectly. In some implementations reminder option 517 may include a count indicative of quantity of drafts accessible via reminder option 517. The count may be a basic assessment of how many drafts exist, but may be filtered based on some kind of criteria, such as age, urgency, associated conversation activity, or the like.

In response to a selection of reminder option 517, such as by way of a mouse click a touch gesture, or some other selection, draft items are identified to be included in the reminder view 541. It may be appreciated that identifying the draft items may occur directly or indirectly in response to reminder view 541 being invoked. It may be appreciated that reminder view 541 may be invoked in a variety of ways in addition to a selection of reminder option 517, such as being automatically triggered upon launching an information management application, on a periodic basis, or in some other manner. In another example, the reminder view may be invoked each time navigation is returned to a particular information module, such as each time a user navigates back to an email module or some other module with respect to which a reminder view is provided.

Identifying the draft items may occur in a variety of ways. In some scenarios, a subset of all existing draft items may be identified for inclusion in reminder view 541. The subset may be selected based on reminder criteria, such as their age, subject, participant associations, the amount of conversation activity, scheduling activity, or any other type of activity associated with each existing draft, or any other suitable criteria for filtering draft items. In some scenarios, it may be the case that all existing drafts are identified for inclusion in the reminder view. In this example, there are five drafts residing in drafts folder all or a subset of which may be included in reminder view 541.

Having identified the draft items for inclusion, reminder view 541 is rendered for display in an overlaid manner with respect to the primary view, of which view 501 is representative. Referring to FIG. 5, it may be appreciated that reminder view 541 is overlaid with respect to view 501. It may also be appreciated that draft email 543, draft email 545, and draft email 547 are included in reminder view 541, representative of the draft items and their selection discussed above. While reminder view 541 includes three draft items, it may be appreciated that less than three or more than three draft items are possible. In fact, in some scenarios it may be possible to scroll up or down or in some other direction to navigate within reminder view 541 to other draft items not readily visible at the outset.

In some implementations, the draft items as rendered within reminder view 541 may include at least some content that was originated during the creation of each draft. For example, a draft email may include in a visible manner some text that was written during creation of the draft. In another example, a task may include some task generated during creation of the task. A draft calendar item may include some event details visible within the context of reminder view 541, as might a contact include some contact information or other draft content. For illustrative purposes, draft email 543 includes draft content 544, draft email 545 includes draft content 546, and draft email 547 includes draft content 548.

In some implementations, any of the draft items may be interacted with or at least selected for additional drafting from within reminder view 541. For example, a user may click on, touch, or otherwise select draft email 545, at which time the user may be able to edit draft email 545, possibly from directly within reminder view 541, but also possibly in some other manner. For example, the user may be taken to another view, such as view 501 or some other view, within which draft email 545 can be edited.

In a variation, reminder option 517 or its functionality may be integrated with drafts folder 529 such that a selection of drafts folder 529 launches reminder view 541. Two types of selections may be supported with respect to drafts folder 529. One selection type may launch the display of the contents of drafts folder arranged in one of the panels, such as by replacing the contents of inbox 531 with the contents of drafts folder 529. Another, different kind of selection may result in the triggering of reminder view 541 such that it is displayed in an overlaid manner with respect to inbox 531.

Figure 6:
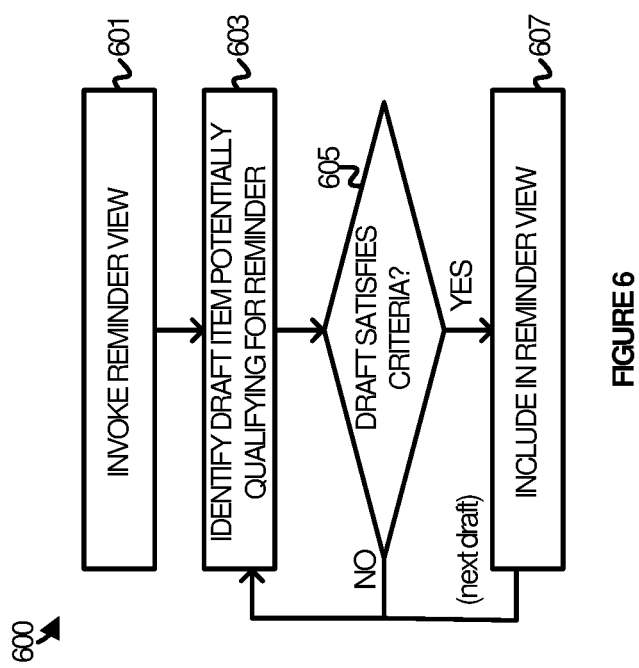
FIG. 6 illustrates another draft reminder process in an implementation.

FIG. 6 illustrates another draft reminder process 600 that may be implemented to determine which drafts to include in reminder view 541. To begin, reminder view 541 is invoked, such as by a touch, click, automated process, or in some other manner as discussed above (step 601). Of a group of draft items, such as draft emails or calendar events, each item is examined in view of reminder criteria to determine if the draft should be included in reminder view 541 (step 603). The reminder criteria may be, for example, a measure of conversation activity, a measure of urgency, or a measure of recentness.

For example, the amount of conversation or other activity associated with a particular draft item may be analyzed against criteria. A draft that has little or no associated conversation may be considered less urgent that other drafts that have relatively more associated conversation activity. However, the opposite situation may also occur. For example, a draft having a relatively high amount of conversation activity may be considered not sufficiently recent to the conversation to draw a user's attention to it.

In another example, the age of a draft may be analyzed against criteria. Drafts exceeding a particular age may qualify for urgent flagging and thus may be selected for inclusion in reminder view 541. Drafts having a younger age may be considered less urgent or in less need of attention, and thus may be left out of reminder view 541.

In yet another example, whether or not a draft item had previously or recently been included in a previous rendering of reminder view 541 may be considered when selecting drafts. For example, it may be more useful to alert a user about a draft that was not included in a previous rendering of reminder view 541, rather than providing yet another reminder about a draft that the user has seen several times within a certain time frame. A user selectable option may also be provided that allows a user to indefinitely remove a draft from reminder view 541 or that allows a user to apply a delay timer or snooze timer to a particular draft item so that the draft item is temporarily excluded from reminder view 541.

A variety of criteria are possible and may be selectively implemented depending upon a user's or an organization's policies. In addition, multiple criteria may be used to filter drafts. For example, both the conversation activity associated with a draft and the age of the draft may be considered when deciding whether or not to include the draft in reminder view 541.

Regardless, for each draft it is determined whether or not the draft satisfies the criteria (step 605). If so, the draft is included in reminder view 541 (step 607) and processing continues on other drafts until there are none. If not, processing still continues on other drafts until there are none to be examined.

It may be appreciated that some steps in draft reminder process 600 may be omitted. For example, it may be that drafts are continuously or periodically analyzed for inclusion in reminder view 541, rather than that step occurring only when reminder view 541 is invoked. In this manner, at least a partial list of draft items may be prepared prior to reminder view 541 being invoked, thereby speeding up its rendering and display.

Figure 7:
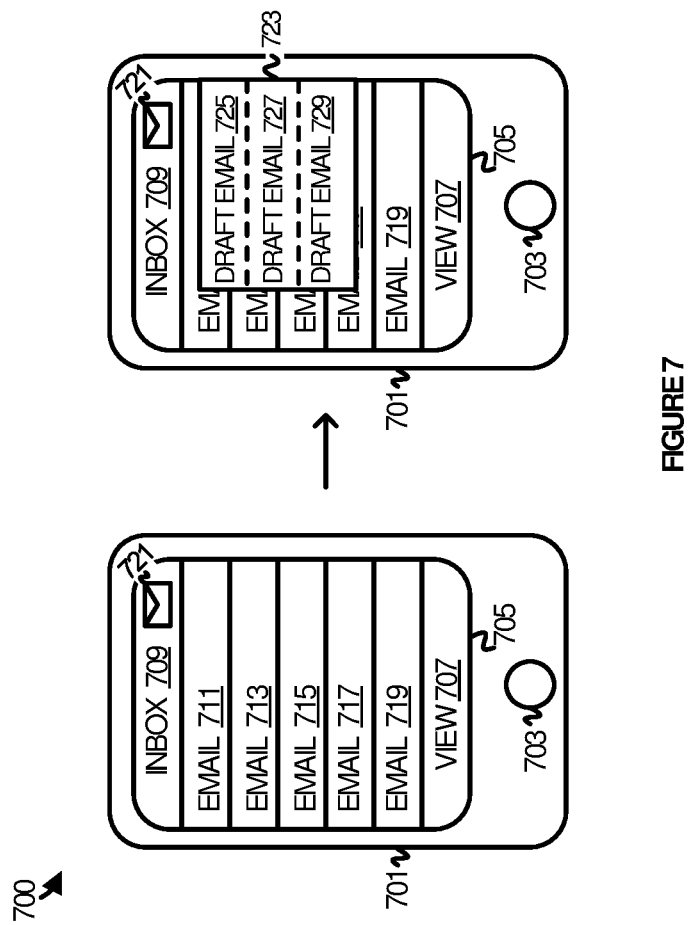
FIG. 7 illustrates an operational scenario associated with an information management application in an implementation.

FIG. 7 illustrates an operational scenario 700 that demonstrates a draft reminder process as implemented on a mobile device, such as a mobile phone. Mobile device 701 may be representative of application platform 407 illustrated in FIG. 4. In addition, mobile device employ a computing architecture, such as computing architecture 300 referred to with respect to FIG. 3.

In this implementation, mobile device 701 executes a mobile version of an information management application, of which a view 707 is provided by display 705. Mobile device 701 also includes control element 703, although it may be appreciated that a variety of designs are possible that do not include control element 703 and may be considered within the scope of the present disclosure. Display 705 may be a touch screen or some other user interface capable of receiving user input.

In operation, view 707 includes inbox 709. Inbox 709 includes a list of emails 711, 713, 715, 717, and 719. In addition, view 707 includes reminder option 721. A user may interface with display 705 or control element 703, or in some other manner, to select any of the emails for viewing, editing, or other interaction. A user may also select reminder option 721 to view any drafts that may need attention.

In the event that reminder option 721 is selected, mobile device 701 identifies draft email to display in a reminder view and then renders the reminder view for display. In this implementation, reminder view 723 is rendered and includes draft email 725, draft email 727, and draft email 729. A user may then proceed to select one of the draft emails for further editing or other consideration. Alternatively, a user may simple dismiss reminder view 723 to engage with another aspect of the information management application.

It may be appreciated from the foregoing implementations and scenarios that a reminder option and a reminder view may be helpful to some users who create drafts and wish to return to them later. In a relatively simple scenario, a user may initiate an email, begin drafting it, and then navigate away. In some non-windowed environments, it may not be possible to return to the draft email without first navigating to a drafts folder and away from some other view, such as that of an inbox. Reminder options and reminder views provide a quick way to view drafts without having to leave a primary view or change the state of the primary view.

In another scenario, in-line replies may be supported by an email application. In such a scenario, a user may initiate a draft reply to an email, the content of which resides in a viewing frame for that email. In other words, initiating the draft may not launch a separate window or other visual cue associated with the draft. To later return to the draft, the user may have to scroll to or otherwise search for the email in response to which the draft was created. This can be time consuming and frustrating.

The various reminder views, reminder options, and draft reminder processes disclosed herein may be applicable to a wide range of applications and environments in addition to information management applications and environments. Social networking websites and associated environments, whether access through web browsers, mobile apps, mobile browsers, or the like, may benefit from such technology. For instance, a user engaged with a social networking site may initiate an intra-site message, a wall posting, a photo share, or some other action that goes uncompleted. Rather than deleting the composition or otherwise losing track of it, a reminder feature may be provided within the site that alerts the user to the existence of a draft message, post, or photo share. In addition, the alert or other reminder view may be displayed in an overlaid fashion with respect to other areas of the site, such as a message repository, a photo gallery, or some other area. In another example, a micro-blogging service or site may employee such reminder technology to assist users with navigating back to draft posts.

The discussion of FIGS. 1-7 for purposes of clarity may have referred to various elements included in information management applications, such as items, draft items, emails, draft emails, options, reminder options, panels, and folders, as well as other elements, without referring to those elements as graphical objects, graphical representations of an element, or in some other manner indicative of their technical nature. However, it may be appreciated that such terms and phrases may be used interchangeably and such usage or lack thereof does not limit the scope of the present disclosure. To the contrary, the present disclosure may be considered to encompass a wide variety of well-known techniques for representing the various elements included in the various implementations discussed throughout. Thus, these and other elements illustrated in FIGS. 1-7 may embodied in graphical objects, modules, other data structures, other graphical representations of the elements, or other combinations or variations thereof. For example, a reminder option referred to as such with respect to the Figures may be considered a reminder option object, a reminder option component, a graphical representation of a reminder option, and so on.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more non-transitory computer readable storage media having program instructions stored thereon for facilitating draft reminders that, when executed by a processing system, direct the processing system to at least:
   render a navigation panel in a user interface to an email application that includes a list of folders, including an inbox folder and a drafts folder;
   render an application bar having a plurality of options selectable to navigate to a plurality of different modules;
   render in the application bar a graphic drafts reminder option, wherein the graphic drafts reminder option is selectable for viewing a subset of draft emails selected from the draft emails in the drafts folder,
   in response to a selection of the graphic drafts reminder option, identify the subset of the draft emails based on a reminder criteria, wherein the reminder criteria comprises a measure of urgency, a measure of recentness, and a measure of conversation activity associated with each of the draft emails;
   when the inbox folder is selected, render a view of an inbox in the user interface that includes a list of emails in the inbox; and
   in response to the graphic drafts reminder option being selected, surface a drafts reminder view, overlaid with respect to the view of the inbox, that includes only the subset of the draft emails, wherein the view of the inbox is maintained while the subset of the draft emails is rendered on top of the view of the inbox.

2. The one or more computer readable storage media of claim 1 wherein the drafts reminder view is automatically invoked on a periodic basis.

3. The one or more computer readable storage media of claim 1 wherein the drafts reminder view is automatically invoked each time navigation is returned to an information module of a plurality of information modules.

4. The one or more computer readable storage media of claim 1 wherein a draft email is an email for which drafting commenced and the email was not sent.

5. The one or more computer readable storage media of claim 1 wherein the graphic drafts reminder option includes a count.

6. The one or more computer readable storage media of claim 1 wherein each of the subset of the draft emails comprises draft content composed therein and wherein the reminder view further comprises at least a portion of the draft content.

7. The one or more computer readable storage media of claim 1 wherein
the subset of the draft emails in the drafts reminder view are editable from within the drafts reminder view by selecting one or more of the subset of the draft emails in the drafts reminder view.

8. A method for facilitating draft reminders comprising:
rendering a navigation panel in a user interface to an email application that includes a list of folders, including an inbox folder and a drafts folder;
rendering an application bar having a plurality of options selectable to navigate to a plurality of different modules;
rendering in the application bar a graphic drafts reminder option, wherein the graphic drafts reminder option is selectable for viewing a subset of the draft emails selected from the draft em ails in the drafts folder;
in response to a selection of the graphic drafts reminder option, identifying the subset of the draft emails based on a reminder criteria, wherein the reminder criteria comprises a measure of urgency, a measure of recentness, and a measure of conversation activity associated with each of the draft emails;
when the inbox folder is selected, rendering a view of an inbox in the user interface that includes a list of emails in the inbox; and
in response to the graphic drafts reminder option being selected, surfacing a drafts reminder view, overlaid with respect to the view of the inbox, that includes only the subset of the draft emails, wherein the view of the inbox is maintained while the subset of the draft emails is rendered on top of the view of the inbox.

9. The method of claim 8 wherein the drafts reminder view is automatically invoked on a periodic basis.

10. The method of claim 8 wherein the drafts reminder view is automatically invoked each time navigation is returned to an information module of a plurality of information modules.

11. The method of claim 8 wherein a draft email is an email for which drafting commenced and the email was not sent.

12. The method of claim 8 wherein the graphic drafts reminder option includes a count.

13. The method of claim 8 wherein each of the subset of the draft emails comprises draft content composed therein and wherein the drafts reminder view further comprises at least a portion of the draft content rendered for display with respect to each of the subset of the draft emails.

14. The method of claim 8 wherein
the subset of the draft emails in the drafts reminder view are editable from within the drafts reminder view by selecting one or more of the subset of the draft emails in the drafts reminder view.

15. A computing apparatus comprising:
one or more non-transitory computer readable storage media;
a processing system operatively coupled with the one or more computer readable storage media;
and program instructions stored on the one or more computer readable storage media that, when executed by the processing system, direct the computing apparatus system to at least:
render a primary view of an information management application, the primary view comprising a plurality of emails in an inbox;
render an application bar comprising a plurality of options selectable to navigate to a plurality of different modules and a graphic drafts reminder option;
in response to a selection of the graphic drafts reminder option, identify, based on reminder criteria, a plurality of draft emails residing in a drafts folder to include in a drafts reminder view, each of the plurality of draft emails comprising draft content composed therein that was not sent, wherein the drafts reminder view is separate from the drafts folder and wherein the reminder criteria comprises a measure of urgency, a measure of recentness, and a measure of conversation activity associated with each of the draft emails; and
in response to a selection of the graphic drafts reminder option, render the drafts reminder view in a manner accessible without navigating away from the primary view, the drafts reminder view comprising only the plurality of draft emails and at least a portion of the draft content composed with respect to each of the plurality of draft emails, wherein the view of the inbox is maintained while the subset of the draft emails is rendered on top of the view of the inbox.

16. The apparatus of claim 15 wherein the drafts reminder view is automatically invoked on a periodic basis.

17. The apparatus of claim 15 wherein the drafts reminder view is overlaid with respect to the primary view and
wherein the plurality of draft emails are editable from within the drafts reminder view by selecting one or more of the of draft emails in the drafts reminder view.

18. The apparatus of claim 15 wherein the drafts reminder view is automatically invoked each time navigation is returned to an information module of a plurality of information modules.

19. The apparatus of claim 15 wherein
the graphic drafts reminder option includes a count.

20. The apparatus of claim 15 further comprising the processing system configured to execute the program instructions and a display that displays the drafts reminder view overlaid on the primary view.

* * * * *